Sept. 30, 1924.
C. A. MILLER
1,510,096
AUTOMATIC BOTTLE UNLOADER
Filed July 29, 1922     2 Sheets-Sheet 1
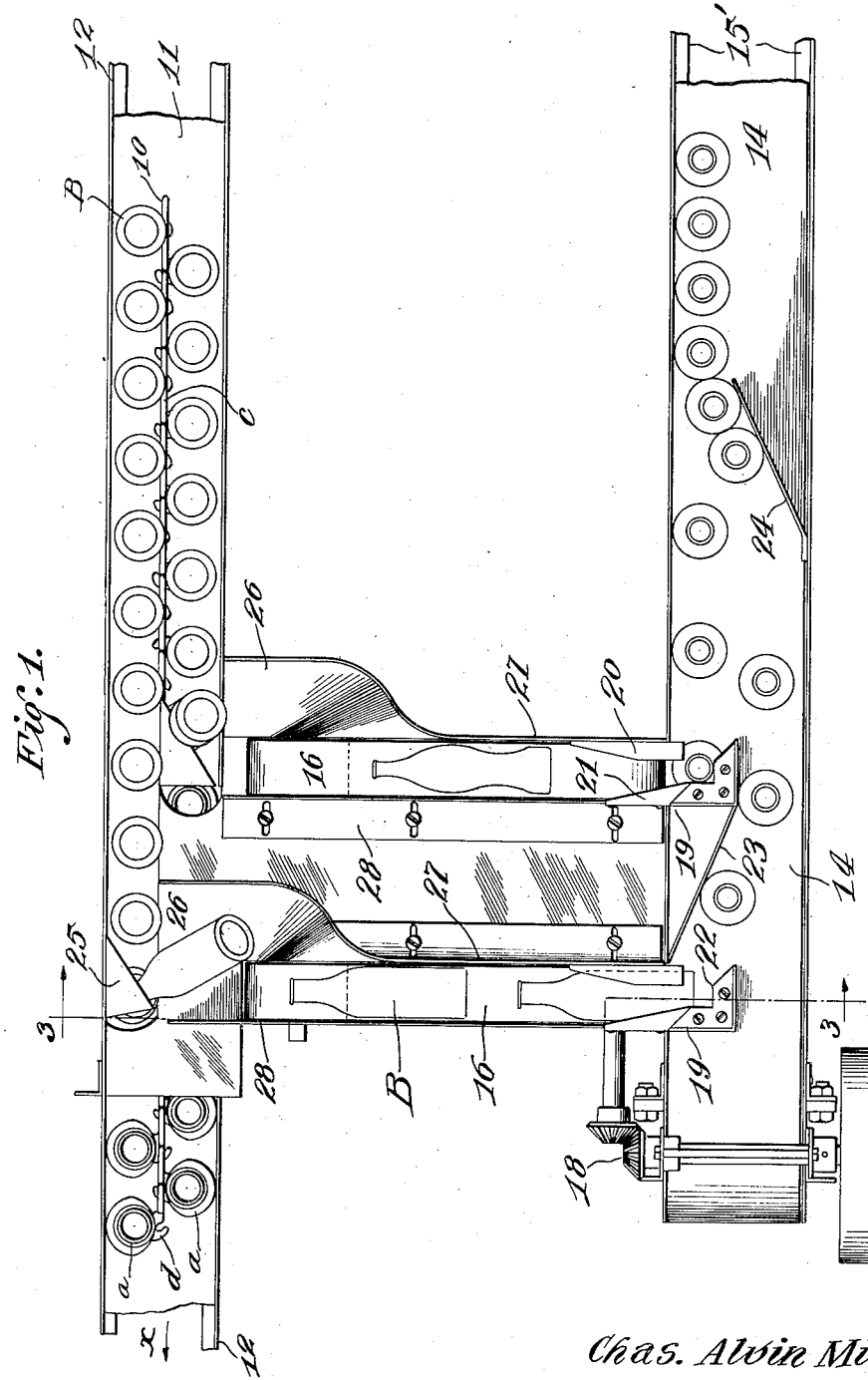
Inventor
Chas. Alvin Miller;
By Mason, Fenwick & Lawrence
Attorneys.

Sept. 30, 1924.
C. A. MILLER
1,510,096
AUTOMATIC BOTTLE UNLOADER
Filed July 29, 1922     2 Sheets-Sheet 2
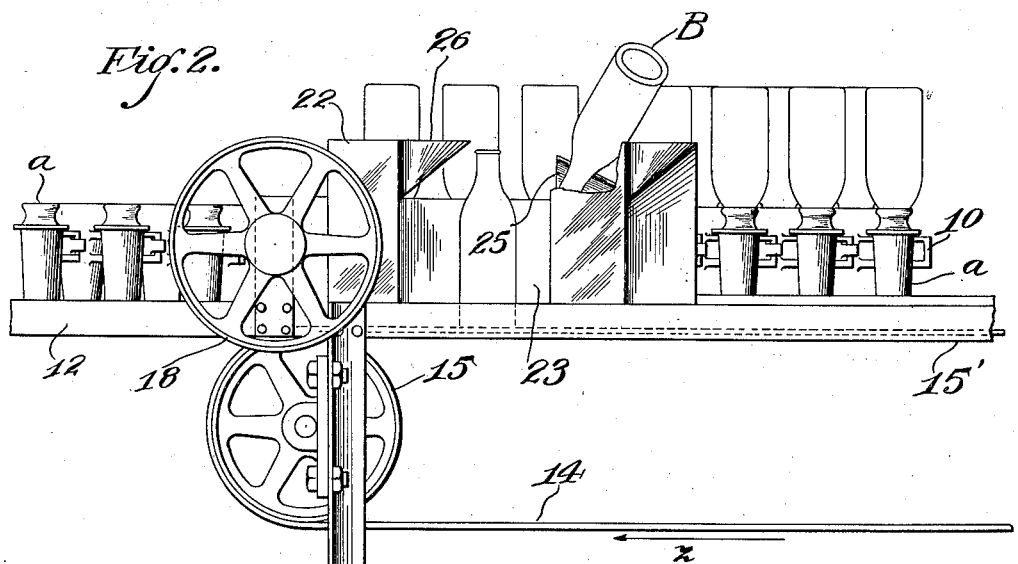
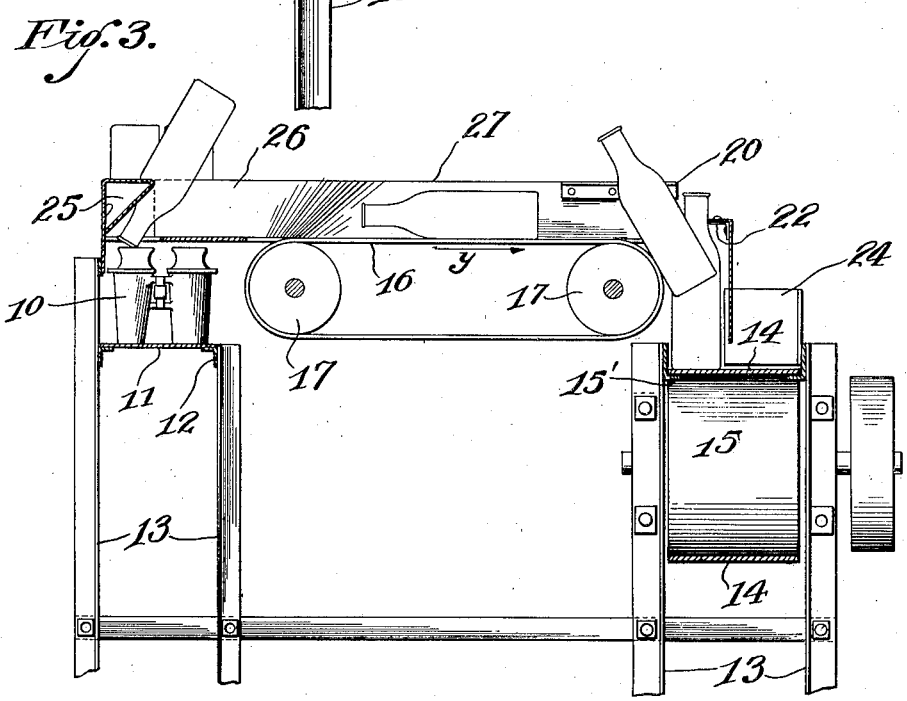
Inventor
Chas. Alvin Miller,
By Mason, Fenwick & Lawrence
Attorneys.

Patented Sept. 30, 1924.

1,510,096

UNITED STATES PATENT OFFICE.

CHARLES ALVIN MILLER, OF BAINBRIDGE, GEORGIA, ASSIGNOR TO MILLER MANUFACTURING COMPANY, OF DECATUR COUNTY, GEORGIA, A CORPORATION OF GEORGIA.

AUTOMATIC BOTTLE UNLOADER.

Application filed July 29, 1922. Serial No. 578,358.

*To all whom it may concern:*

Be it known that I, CHARLES A. MILLER, a citizen of the United States, residing at Bainbridge, in the county of Decatur and State of Georgia, have invented certain new and useful Improvements in Automatic Bottle Unloaders; and I do hereby declare the following to be a full, clear, and exact description of the invention, such as will enable others skilled in the art to which it appertains to make and use the same.

In certain types of bottle washing machines the bottles are supported in inverted position on an endless bottle carrier. It is an object of this invention to provide mechanism for unloading the bottles from said carrier after they have been washed, the unloading consisting in removing the bottles from the carrier and placing them on a suitable support in an upright position on their bases in position for filling. In the present invention, the bottles are unloaded from a traveling carrier and placed on a support arranged below the level of said carrier, there being a bottle transferring means between the carrier and landing support. In the present instance the transfer means includes a movable element in the form of an endless belt on which the bottles are carried along in toppled-over position.

The various novel features of the invention will appear from the detailed description of the same taken in connection with the accompanying two sheets of drawings forming part of this specification, the scope of the invention being defined in the appended claims.

In the drawings,—

Figure 1 is a plan view illustrating the application of the invention;

Fig. 2 is a side elevation of Fig. 1, and

Fig. 3 is a transverse section on line 3—3 of Fig. 1.

In the drawings, 10 indicates a bottle carrier in the form of an endless chain preferably of the type shown in my prior Patent No. 1,181,913, granted May 2, 1916. Briefly described, the carrier comprises a series of annular sockets *a* arranged in staggered relation on a chain, each socket being open at the top and bottom and preferably having a flaring top in order to allow the neck of a bottle B to fit snugly into it. Each socket carries a link *c* and an offset hook *d* adapted to couple with a mating link. This carrier moves in a horizontal plane being driven by suitable mechanism not shown.

11 indicates a platform or plate on which the bottoms of the sockets rest or slide in passing the unloading point hereinafter described. 12 are angle irons supporting said plate and 13 is any suitable frame work on which the above mentioned mechanism and other mechanism to be described are supported.

14 is an endless belt, one of the drums or wheels over which said belt is looped being shown at 15, the belt being driven in any suitable manner. The upper run of this belt constitutes a support for the bottles after they have been transferred from the carrier by mechanism to be described. The upper run of this belt or support is arranged on a lower level than the tops of the bottle-carrying sockets *a* whereby a drop is provided between said members and is maintained in flat condition by means of suitable supports 15'.

16 is a bottle transfer comprising a belt extending between the bottle carrier 10 and the support 14. This belt is looped over drums or wheels 17 driven by any suitable form of driving means such as is generally indicated at 18. The looped end of the belt adjacent the support 14 is so disposed relatively thereto that a bottle will land on the support 14 as it passes over the looped end of the belt. Bottle guiding means 19 between the support 14 and belt 16 serve to properly position the bottles on said support as they are making the drop. These means preferably take the form of flanges 20 and 21 overlying and disposed above said belt sufficiently high to allow the flat-lying bottles to pass thereunder as clearly shown in Fig. 1. These flanges together provide a channel or guideway through which the neck of the bottle rises and passes as the bottle is carried over the loop (see Fig. 3).

In order to arrest the swinging movement imparted to a bottle as it passes over the loop and thus to prevent its toppling over after it lands on the support 14, there is provided an abutment 22 against which the neck of the bottle will abut. The guideway defined by the flanges 20, 21 and 22 is L-shaped in plan. Inasmuch as the support 14 is a traveling member, the bottles will be carried away from the guides 19 as soon as the bottles have landed on the same. As shown, there is provided a pair of belts 16 one for each row of bottles on the carrier. Extending between said guides is a deflecting plate 23 for deflecting the bottles away from the adjacent guide 19 as will be readily understood by reference to Fig. 1. A second deflecting plate or member 24 is provided at one side of the projecting guide member 19 to bring the bottles into a common row for filling.

The mechanism for transferring or bowling over the bottles from the bottle carrier to the belt 16 will now be described. Disposed over the bottle carrier 10 in the path of the bottles is a combined bottle lifter and toppler 25. This member 25 is suitably supported from the frame work 13 and comprises, in the present instance, a member triangular in plan extending diagonally across the path of the bottles and arranged at an incline with respect to said carrier, whereby the bottles tend to ride up said lifter as they are carried toward it and will be keeled over by the diagonally extending edge of the same.

Between the member 25 and belt 16 is a hopper-like member 26 for receiving and conducting the toppled-over bottles on to the transfer belt 16. This hopper member may be continued as a side wall 27 along the belt and a side wall 28 for the other side of the belt may also be provided.

The operation of the mechanism will now be briefly described. Assuming that the various endless members are traveling in the directions indicated by arrows $x$, $y$ and $z$, the bottles will be moving toward the member 25 as they come from the washer, not shown. The bottles will be elevated out of their supporting sockets $a$ and will be keeled over by said member 25 and will fall into the hopper 26 and onto the transfer belt 16. The upper run of the belt 16 carries the bottles base foremost, away from the carrier 10 and toward the support or endless belt 14. When the bottles arrive at the drop constituted by the looped end of the belt 16 adjacent the support 14 they will fulcrum or swing to an upright position and will land on their bases on the support 14. The bottles are prevented from toppling over and are guided into upright position on said support by the guiding means 19. Inasmuch as the support 14 is a traveling endless belt the bottles will be carried along by the belt or support as soon as they land thereon. After the bottles land on the belt or support 14 they may be positioned thereon in any suitable manner for the filling operation.

The invention has been particularly designed for use in connection with the bottle carrier as described in the patent above referred to, but the application of the invention is not limited to the use of any particular bottle carrier.

While I have defined the invention with considerable particularity of detail, I desire it to be distinctly understood that I intend no limitations of the invention except as may be defined by the appended claims.

What I claim is:

1. The combination with a carrier on which bottles are adapted to be supported in inverted position, of a bottle support arranged laterally thereof and below the level of the same, an endless belt extending between said carrier and support, one terminal of the upper run of said belt being above said support whereby a drop is had between said support and belt, means extending over said carrier in the path of the bottles carried thereon and causing the bottles to topple over onto said belt, and an abutment spaced from the said belt terminal and overlying said support, the bottles being carried bottom forward toward said abutment but passing below the same and landing bottom down on said support, the necks of the bottles striking said abutment as the bottles drop, said abutment preventing overturning of the bottles after they land on said support.

2. The combination with a carrier on which bottles are adapted to be supported in inverted position, of a bottle support arranged laterally thereof and below the level of the same, an endless belt extending between said carrier and support, one terminal of the upper run of said belt being above said support whereby a drop is had between said support and belt, means causing the bottles to topple over onto said belt when in front of the same, and means for guiding the bottles in their drop from the belt to said support.

3. The combination with a carrier on which bottles are adapted to be supported in inverted position, of a bottle support arranged laterally thereof and below the level of the same, an endless belt extending between said carrier and support, one terminal of the upper run of said belt being above said support whereby a drop is had between said support and belt, means extending over said carrier in the path of the bottles carried thereon and causing the bottles to topple over onto said belt, and means for guiding the bottles in their drop from the belt to said support.

4. The combination with a carrier on which bottles are adapted to be supported in inverted position, of a movable bottle-support disposed at one side of said carrier, an endless belt adapted to transfer bottles from the carrier to the said support, the level of the upper run of the belt being so disposed as to provide a drop between said support and the adjacent loop of the belt, means for shifting the bottles from the carrier onto the belt when the bottles are opposite the latter, and means on the support for receiving the bottles in upright condition as they pass over the said loop.

5. The combination with a carrier on which bottles are adapted to be supported in inverted position, of a bottle support arranged laterally thereof and below the level of the same, an endless belt extending between said carrier and support, one terminal of the upper run of said belt being above said support whereby a drop is had between said support and belt, means extending over said carrier in the path of the bottles carried thereon and causing the bottles to topple over onto said belt, said means comprising a member extending diagonally of the carrier, and means for guiding the bottles in their drop from the belt to said support.

6. The combination with a carrier on which bottles are adapted to be supported in inverted position, of a bottle support arranged laterally thereof and below the level of the same, an endless belt extending between said carrier and support, one terminal of the upper run of said belt being above said support whereby a drop is had between said support and belt, means extending over said carrier in the path of the bottles carried thereon and causing the bottles to topple over onto said belt, said means including an inclined member up which the bottles tend to ride, said member extending diagonally across said carrier, and means for guiding the bottles in their drop from the belt to said support.

7. The combination with a carrier on which bottles are adapted to be supported in inverted position, of a bottle support arranged laterally thereof and below the level of the same, an endless belt extending between said carrier and support, one terminal of the upper run of said belt being above said support whereby a drop is had between said support and belt, an inclined member overlying said carrier and up which the bottles tend to ride, said member extending diagonally across said carrier, and means for guiding the bottles in their drop from the belt to said support.

8. The combination with a carrier on which bottles are adapted to be supported in inverted position, of a bottle support arranged laterally thereof and below the level of the same, an endless belt extending between said carrier and support, one terminal of the upper run of said belt being above said support whereby a drop is had between said support and belt, an inclined member overlying said carrier and up which the bottles tend to ride, said member extending diagonally across said carrier, means guiding the bottles toward said belt after they have been toppled over as said, and means for guiding the bottles in their drop from the belt to said support.

9. The combination with a carrier on which bottles are adapted to be supported in inverted position, of a bottle support arranged laterally thereof and below the level of the same, an endless belt extending between said carrier and support, one terminal of the upper run of said belt being above said support whereby a drop is had between said support and belt, means extending over said carrier in the path of the bottles carried thereon and causing the bottles to topple over onto said belt, means overlying said belt adjacent said terminal and defining an open guide-way between which the neck of the bottles will pass as the bottles are making the drop from said belt to said support, and means preventing the bottles from toppling over after the bottles land on said support.

10. The combination with a carrier on which bottles are adapted to be supported in inverted position, of a bottle support arranged laterally thereof and below the level of the same, an endless belt extending between said carrier and support, one terminal of the upper run of said belt being above said support whereby a drop is had between said support and belt, means extending over said carrier in the path of the bottles carried thereon and causing the bottles to topple over onto said belt, means overlying said belt adjacent said terminal and defining an open guide-way between which the neck of the bottles will pass as the bottles are making the drop from said belt to said support, and an abutment spaced from and extending across the end of said guideway, the necks of the bottles striking said abutment as the bottles drop, said abutment preventing overturning of the bottles after they land on said support.

11. The combination with a carrier on which bottles are adapted to be supported in inverted position, of a bottle support arranged laterally thereof and below the level of the same, a plurality of belts extending between said carrier and support, one terminal of the upper run of each belt being above said support whereby a drop is had between said support and the respective belt, means extending over said carrier in the path of the bottles carried thereon and causing the bottles to topple over onto said belts, and bottle-deflecting means between the drop ends of said belts for deflecting the bottles dropped from one belt out of the path of the drop ends of the adjacent belt.

12. In combination, a carrier on which the bottles may be supported in inverted position, means for bowling over the bottles carried thereon comprising an inclined lifter disposed over the carrier and up which the bottles tend to ride said lifter located to engage the bulge in the bottles between the neck and the body thereof.

In testimony whereof I affix my signature.

CHARLES ALVIN MILLER.